(12) United States Patent
Choo (10) Patent No.: US 12,510,685 B2
(45) Date of Patent: Dec. 30, 2025

(54) ELECTROMAGNETIC WAVES RESISTIVITY COMPUTATION USING ACCELERATED SEGMENTED LOOKUP TABLE

(71) Applicant: Halliburton Energy Services, Inc., Houston, TX (US)

(72) Inventor: Weng Fatt Choo, Pontian (MY)

(73) Assignee: Halliburton Energy Services, Inc., Houston, TX (US)

( * ) Notice: Subject to any disclaimer, the term of this patent is extended or adjusted under 35 U.S.C. 154(b) by 236 days.

(21) Appl. No.: 16/651,683

(22) PCT Filed: Dec. 28, 2017

(86) PCT No.: PCT/US2017/068787
§ 371 (c)(1),
(2) Date: Mar. 27, 2020

(87) PCT Pub. No.: WO2019/132936
PCT Pub. Date: Jul. 4, 2019

(65) Prior Publication Data
US 2020/0264332 A1    Aug. 20, 2020

(51) Int. Cl.
*G01V 3/38* (2006.01)
*E21B 47/12* (2012.01)
*E21B 47/18* (2012.01)
*E21B 49/00* (2006.01)
*G01V 3/30* (2006.01)

(52) U.S. Cl.
CPC ............... *G01V 3/38* (2013.01); *E21B 47/12* (2013.01); *E21B 47/18* (2013.01); *E21B 49/00* (2013.01); *G01V 3/30* (2013.01)

(58) Field of Classification Search
CPC .. G01V 3/38; G01V 3/30; E21B 47/18; E21B 49/00; E21B 47/12
USPC ........................................................... 702/7
See application file for complete search history.

(56) References Cited

U.S. PATENT DOCUMENTS

| 4,209,747 A | 6/1980 | Hutchital |
| 4,899,112 A * | 2/1990 | Clark ................ G01V 3/30 324/338 |
| 5,329,448 A | 7/1994 | Rosthal |

(Continued)

FOREIGN PATENT DOCUMENTS

| CN | 100564797 C * | 12/2009 | ............. E21B 47/13 |
| GB | 2513830 B | 7/2016 | |
| WO | WO-2019066672 A1 * | 4/2019 | ............... G01V 3/28 |

OTHER PUBLICATIONS

English translation of CN-100564797, Dec. 2, 2009. (Year: 2009).*

(Continued)

*Primary Examiner* — Michael P Nghiem
(74) *Attorney, Agent, or Firm* — Benjamin Ford; C. Tumey Law Group PLLC (57) ABSTRACT

A method for well logging may comprise: inserting a downhole tool into a wellbore penetrating a subterranean formation wherein the downhole tool comprises: a transmitter; a receiver; a memory configured to store at least one look up table with polynomial coefficients; and a processor coupled to the memory; obtaining a measurement using the resistivity tool; and generating a resistivity output using the measurement as an input to a polynomial with polynomial coefficients sourced from the look up table.

7 Claims, 5 Drawing Sheets

(56) References Cited

U.S. PATENT DOCUMENTS

| | | | |
|---|---|---|---|
| 5,955,884 A * | 9/1999 | Payton | G01V 3/26 324/339 |
| 5,966,013 A * | 10/1999 | Hagiwara | G01V 3/38 702/7 |
| 6,184,685 B1 * | 2/2001 | Paulk | G01V 3/30 324/338 |
| 7,085,235 B2 | 8/2006 | Pin et al. | |
| 7,804,060 B2 | 9/2010 | Guo et al. | |
| 8,060,309 B2 | 11/2011 | Xue et al. | |
| 8,891,675 B2 | 11/2014 | Yang et al. | |
| 9,225,501 B2 | 12/2015 | Azadet | |
| 2004/0090234 A1 * | 5/2004 | Macune | G01V 3/30 324/337 |
| 2013/0113490 A1 | 5/2013 | Wang et al. | |
| 2015/0039231 A1 | 2/2015 | Celepcikay et al. | |
| 2015/0359264 A1 * | 12/2015 | Fernando | A24F 40/46 250/281 |
| 2016/0178787 A1 * | 6/2016 | Le | G01V 3/28 702/7 |
| 2017/0010387 A1 * | 1/2017 | Huang | G01V 11/00 |
| 2017/0019525 A1 * | 1/2017 | Hannon | G01S 1/752 |
| 2017/0176614 A1 * | 6/2017 | Alhukail | G01V 1/32 |
| 2019/0094405 A1 * | 3/2019 | Itskovich | G01V 3/28 |

OTHER PUBLICATIONS

ISRWO International Search Report and Written Opinion for PCT/US2017/068787 dated Sep. 20, 2018.

Yan Zhang and Aarne Mammela, Comparison of Look-Up Table minimization methods for Real-Time Power Amplifier Simulation, VTT Electronics, 2005.

Halliburton. "ADR Azimuthal Deep Resistivity Service." Halliburton Data Sheet, 2019. H0131192 06/19. PDF file. 1 page.

Halliburton. "Quasar Pulse M/LWD Service." Halliburton Data Sheet, 2019. H013326 07/19. PDF file. 1 page.

Halliburton. "Quasar Trio M/LWD Triple-Combo Service." Halliburton Data Sheet, 2018. H011520 03/18. PDF file. 1 page.

Saudi Arabian Office Action for SA Patent Application No. 520411994 dated Sep. 18, 2022. English Translation with Original Untranslated Version, PDF file. 17 pages.

Saudi Arabian Office Action for SA Patent Application No. 520411994 dated Apr. 15, 2023. English Translation with Original Untranslated Version, PDF file. 19 pages.

* cited by examiner

ELECTROMAGNETIC WAVES RESISTIVITY COMPUTATION USING ACCELERATED SEGMENTED LOOKUP TABLE

BACKGROUND

Wellbores drilled into subterranean formations may enable recovery of desirable fluids (e.g., hydrocarbons) using a number of different techniques. A logging tool, such as a resistivity tool, may be employed in subterranean operations to determine wellbore and/or formation properties. A resistivity tool may transmit electromagnetic waves through a formation which may be received by a receiver and subsequently transformed to an analog signal. The analog signal may be converted to a digital signal and then transformed to a resistivity reading by a resistivity lookup table and Lagrange interpolation. Resistivity lookup and Lagrange interpolation may consume significant memory and processing cycles on the logging tool.

BRIEF DESCRIPTION OF THE DRAWINGS

These drawings illustrate certain aspects of some examples of the present disclosure, and should not be used to limit or define the disclosure.

DETAILED DESCRIPTION

During wellbore drilling a bottom hole assembly comprising a drill bit may be used to extend a wellbore through a subterranean formation. The bottom hole assembly may further comprise a wellbore tool and downhole data processing system for processing data from the downhole tool. A downhole data processing system may have limited computational resources due to design constraints imposed by the wellbore conditions the data processing system may operate in. Computational resources required to process data from the downhole tool may be reduced by implementing a segmented lookup table.

Figure 1:
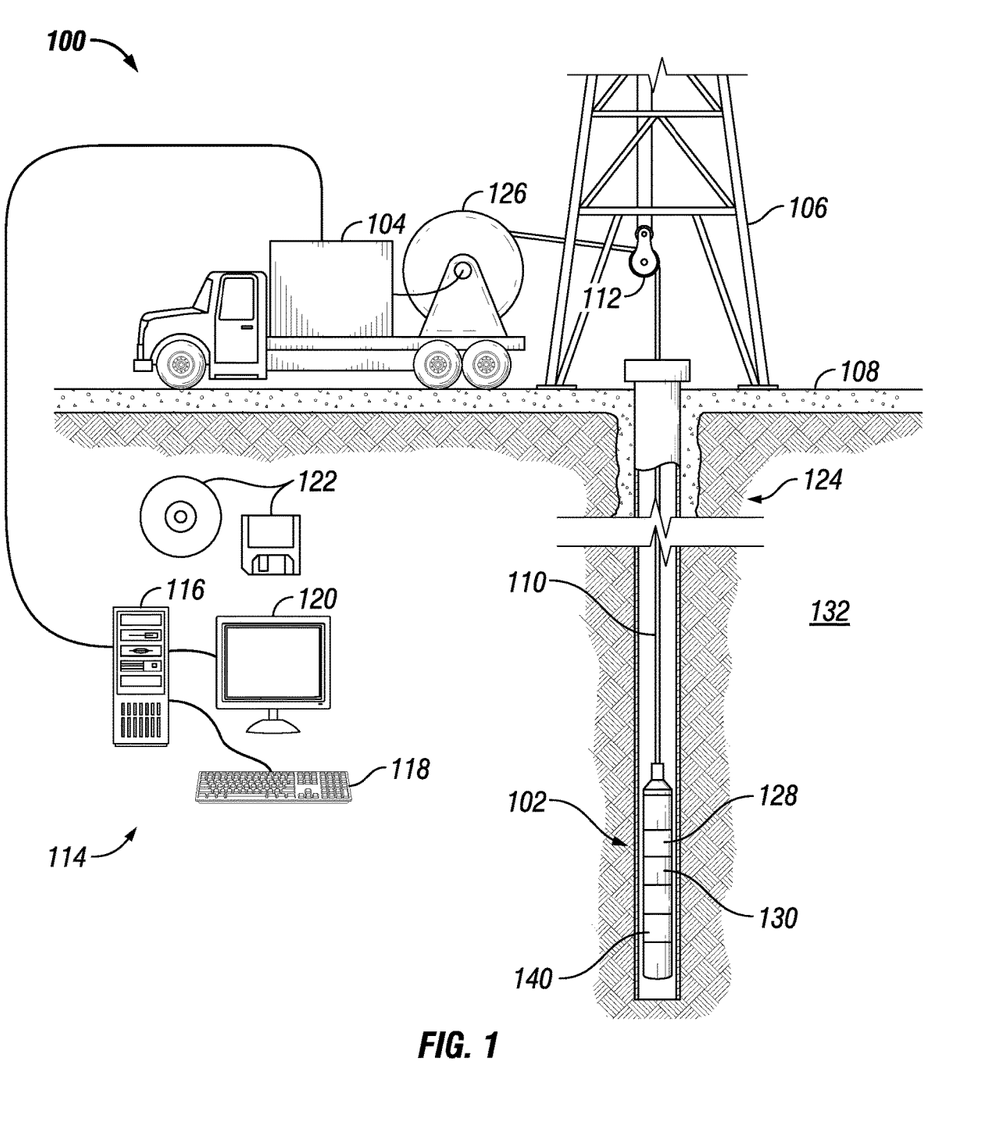
FIG. 1 illustrate an example of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a transmitter 128 and/or a receiver 130. In examples, downhole tool 102 may operate with additional equipment (not illustrated) on surface 108 and/or disposed in a separate well measurement system (not illustrated) to record measurements and/or values from formation 132. During operations, transmitter 128 may broadcast a signal from downhole tool 102. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114. Information handling system 114 in conjunction with downhole processing system 140 may control the operation of receiver 130. For example, the broadcasted signal from transmitter 128 may be reflected by formation 132. The reflected signal may be recorded by receiver 130. The recorded signal may be transferred to downhole processing system 140 for processing. The processed data from downhole processing system 140 may be sent up hole to information handling system 114. In examples, there may be any suitable number of transmitters 128 and/or receivers 130, which may be controlled by information handling system 114 and downhole processing system 140. Information and/or measurements may be processed further by information handling system 114 to determine properties of borehole 124, fluids, and/or formation 132.

Figure 2:
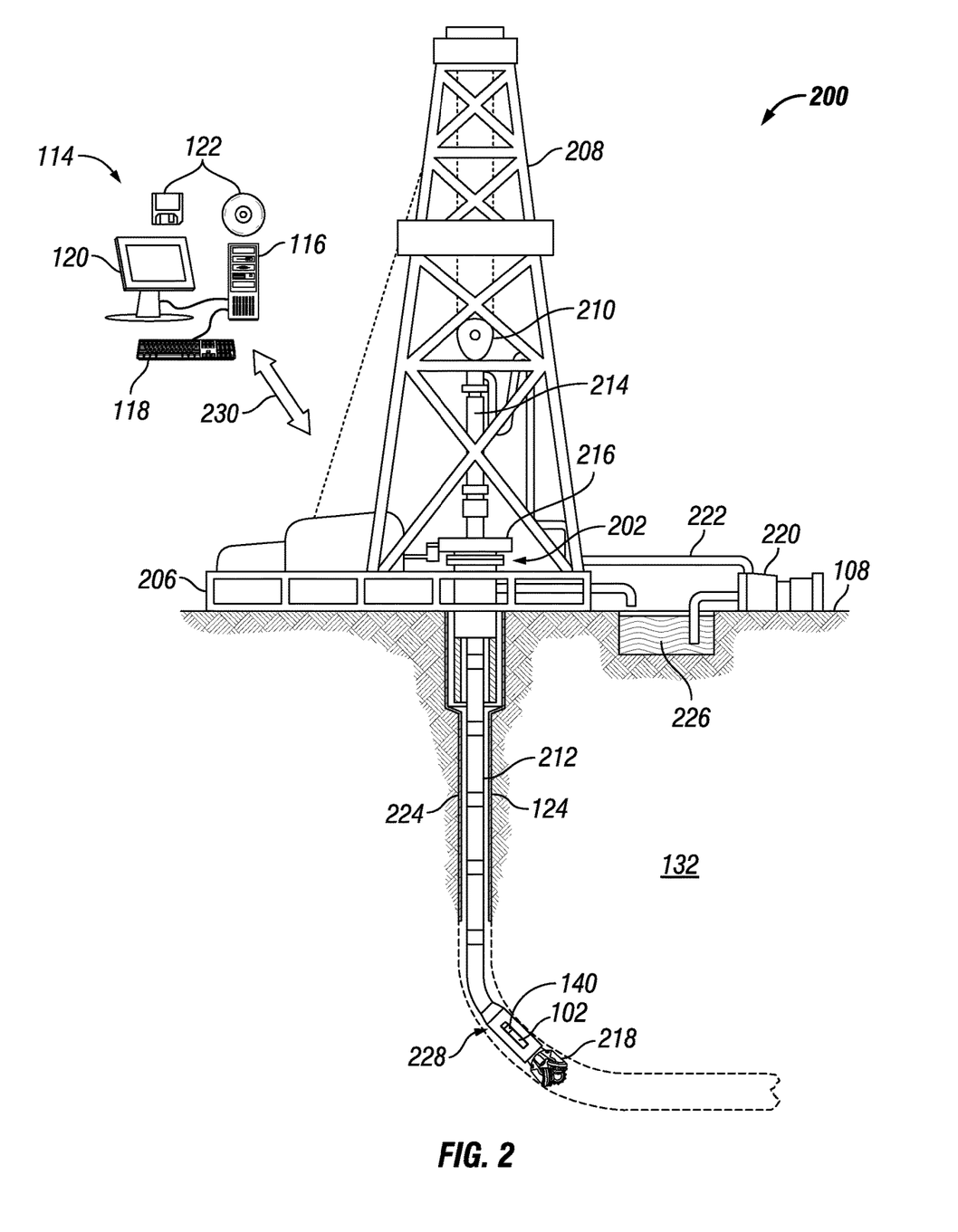
FIG. 2 illustrates another example of a well measurement system.

FIG. 2 illustrates an example in which downhole tool 102 may be disposed in a drilling system 200. As illustrated, borehole 124 may extend from a wellhead 202 into a formation 132 from surface 108. Generally, borehole 124 may include horizontal, vertical, slanted, curved, and other types of wellbore geometries and orientations. Borehole 124 may be cased or uncased. In examples, borehole 124 may comprise a metallic material. By way of example, the metallic member may be a casing, liner, tubing, or other elongated steel tubular disposed in borehole 124.

As illustrated, borehole 124 may extend through formation 132. As illustrated in FIG. 2, borehole 124 may extending generally vertically into formation 132, however borehole 124 may extend at an angle through formation 132, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates formation 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise downhole tool 102. Downhole tool 102 may be disposed on the outside and/or within bottom hole assembly 228. Downhole tool 102 may comprise a plurality of transmitters 128 and receivers 130. Downhole tool 102 and/or the plurality of transmitters 128 and receivers 130 may operate and/or function as described above. As will be appreciated by those of ordinary skill in the art, bottom hole assembly 228 may be a measurement-while drilling (MWD) or logging-while-drilling (LWD) system.

Without limitation, bottom hole assembly 228, transmitter 128, and/or receiver 130 may be connected to and/or controlled by information handling system 114, which may be disposed on surface 108. Additionally, downhole processing system 140 may be disposed on downhole tool 102 or bottom hole assembly 228. Downhole processing system 140 may work in conjunction with information handling system 114. Furthermore, without limitation, information handling system 114 may be disposed down hole in bottom hole assembly 228. Processing of information recorded may occur down hole and/or on surface 108. Processing occurring downhole may occur in downhole processing system 140, the processed information which may then be transmitted to surface 108 to be recorded, observed, and/or further analyzed. In another instance, information recorded on information handling system 114 or downhole processing system 140 that may be stored until bottom hole assembly 228 may be brought to surface 108. In examples, information handling system 114 and downhole processing system 140 may communicate with bottom hole assembly 228 through a communication line (not illustrated) disposed in (or on) drill string 212. In examples, wireless communication may be used to transmit information back and forth between information handling system 114, downhole processing system 140, and other components of bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Bottom hole assembly 228 may comprise a transmitter 128 and/or a receiver 130. In examples, bottom hole assembly 228 may operate with additional equipment (not illustrated) on surface 108 and/or disposed in a separate well measurement system (not illustrated) to record measurements and/or values from subterranean formation 204. During operations, transmitter 128 may broadcast a signal from bottom hole assembly 228. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114. Information handling system 114 may control the operation of receiver 130. For example, the broadcasted signal from transmitter 128 may be reflected by subterranean formation 204. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or subterranean formation 204.

Electromagnetic wave resistivity tools may be used to measure a physical property of a formation 132 such as, resistivity of formation 132. A resistivity tool may comprise two or more transmitters and two or more receivers spaced apart on the resistivity tool. An electromagnetic wave may be propagated from each of the two or more transmitters at a certain frequency through the subterranean formation. The subterranean formation may comprise portions of relatively higher or lower resistance which may allow the electromagnetic wave to propagate relatively more or less. The electromagnetic wave may be received by the two or more receivers and transform the received electromagnetic wave into an electrical signal.

Figure 3:
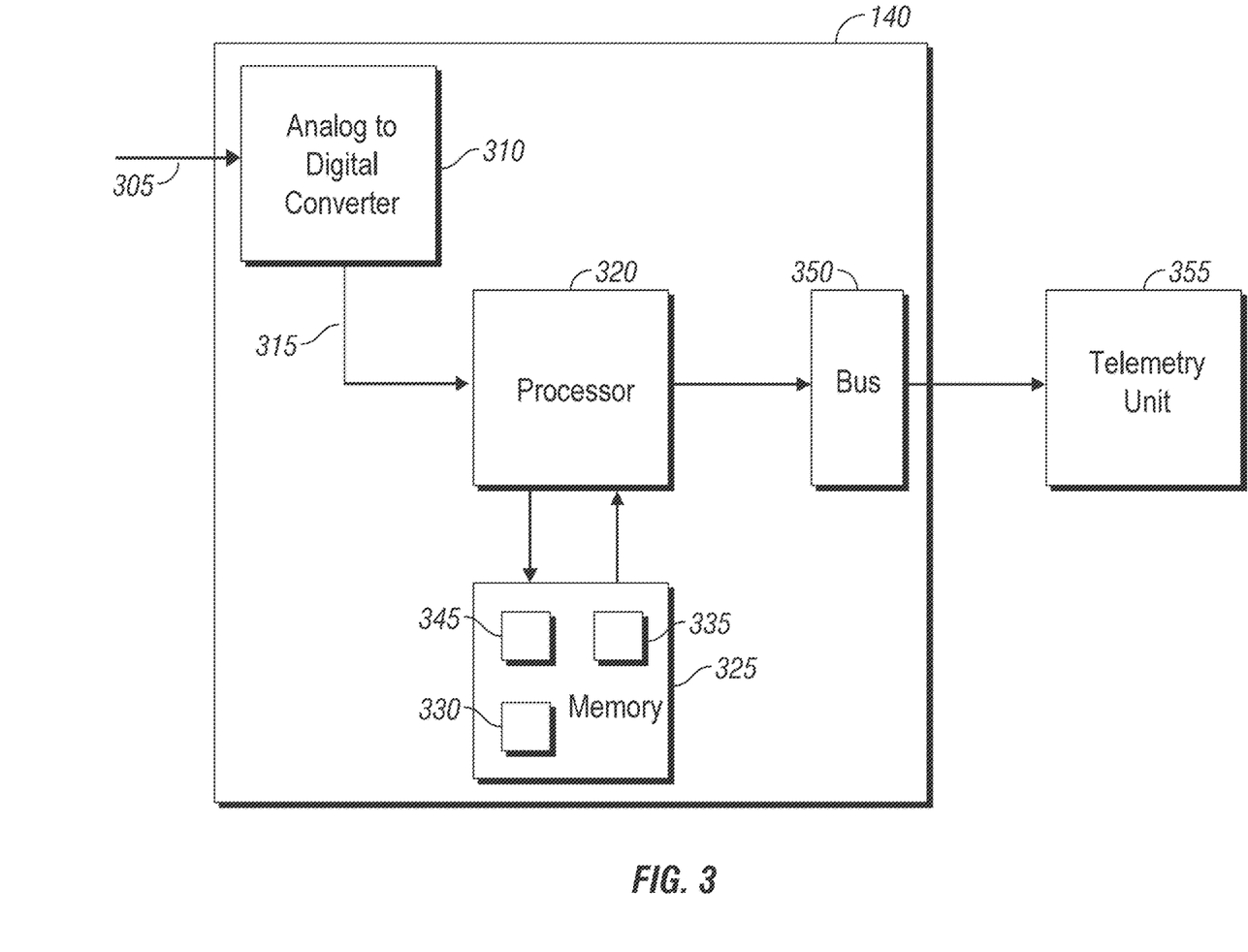
FIG. 3 illustrates an example of a downhole processing system.

FIG. 3 illustrates a detailed view of the downhole processing system 140 from FIGS. 1 and 2. An analog to digital converter 310 may receive an electrical signal 305 and transform the analog signal to a digital signal 315. Electrical signal 305 may be an output signal from a downhole tool. Digital signal 315 may be sent from analog to digital converter 310 to processor 320. Processor 320 may be coupled to memory 325 which may comprise software 330 capable of interpreting digital signal 315. Processor 320 in conjunction with software 330 in memory 325 may process the digital signal with differential Fourier transform to determine the attenuation and phase difference, for example, between the signals received from downhole tools.

Digital signal 315 may comprise attenuation data or phase data which may be converted to a resistivity by a method of resistivity table lookup with Lagrange interpolation. A lookup table 335 and a segmented lookup table 345 may reside in memory 325. Although described herein as memory, one or ordinary skill would understand that the techniques and methods described herein may apply to any other data storage medium such as firmware, non-volatile memory, and other storage mediums well known in the art. Given an attenuation data point from digital signal 315, software program 330 in conjunction with processor 320 may search lookup table 335 and determine the resistivity corresponding to the attenuation data point. Similarly, a phase data point may be searched for in lookup table 335 to determine the resistivity corresponding to the phase data point. Processor 320 may send the resistivity data to a bus 350 which may further send the resistivity data to telemetry unit 355. Telemetry unit 355 may be any telemetry unit previously described, such a mud pulse telemetry unit, which may propagate the resistivity data to the surface for further processing or analysis.

Table 1 illustrates an example lookup table 335 for a certain frequency of electromagnetic wave. The electromagnetic wave may be from a downhole tool such as a resistivity tool.

TABLE 1

| Data No. | Resistivity |
|---|---|
| 1 | $R_1$ |
| 2 | $R_2$ |
| ... | ... |
| n | $R_n$ |

| Data No. | Attn. $L_2$ |
|---|---|
| 1 | $A_{2,1}$ |
| 2 | $A_{2,2}$ |
| ... | ... |
| n | $A_{2,n}$ |

| Data No. | Phase $L_m$ |
|---|---|
| 1 | $P_{m,1}$ |
| 2 | $P_{m,2}$ |
| ... | ... |
| n | $P_{m,n}$ |

| Data No. | Attn. $L_1$ |
|---|---|
| 1 | $A_{1,1}$ |
| 2 | $A_{1,2}$ |

TABLE 1-continued

| Data No. | | |
|---|---|---|
| ... | ... | |
| n | $A_{1,n}$ | |
| Data No. | Phase $L_2$ | |
| 1 | $P_{2,1}$ | |
| 2 | $P_{2,2}$ | |
| ... | ... | |
| n | $P_{2,n}$ | |
| Data No. | Phase $L_1$ | |
| 1 | $P_{1,1}$ | |
| 2 | $P_{1,2}$ | |
| ... | ... | |
| n | $P_{1,n}$ | |
| Data No. | Attn. $L_m$ | |
| 1 | $A_{m,1}$ | |
| 2 | $A_{m,2}$ | |
| ... | ... | |
| n | $A_{m,n}$ | |

A lookup table such as that shown in Table 1 may comprise sub tables for attenuation from length 1 to length m, phase from length 1 to length m, and resistivity. The lengths correspond to the data points for each spacing of the set of two or more receivers and two or more transmitters. For example, a set of receivers and transmitters may be spaced at 16 inches (40.64 cm), 32 inches (81.28 cm), 48 inches (121.92 cm), or any other arbitrary spacing. The lookup tables may comprise data points from 1 to n. Formation 132 resistivity may be usually be in a range of about 0.2 ohm-meters to about 1,000 ohm-meters while some formation 132 with low porosity and water content reaching potentially as high as 20,000 ohm-meters. Memory and storage space may be limited on downhole tool 102 and downhole processing system 140 which may make storing data for every value of resistivity impractical. Lookup table 335 may be of a finite length which may define the number of data points lookup table 335 comprise. For example, selecting n=200 with a range of 0.2 to 1000 ohm-meters resistivity measurement would yield approximately a resolution of 5 ohm-meters (1000−0.2)/200=4.999 in the lookup table assuming that lookup table comprises data points that are evenly spaced. In another example, the data points may not be evenly spaced and may comprise any distribution of data points appropriate for a particular resistivity tool configuration. Additionally, each frequency the resistivity tool operates at may require a different set of lookup tables.

The lookup tables may be generated based on first principles augmented by empirical data from laboratory testing, model parameter fitting, and sensor characterization. One of ordinary skill in the art would understand how to generate a lookup table for a given sensor arrangement.

Processor 320 may access the lookup table 335 and perform a binary search using the attenuation or phase data as a search parameter to find the index in the table the data falls into. In the instance where the attenuation or phase data falls between data points in the table, the processor may then perform an expansion around the data point at the index using a "u" order polynomial with Lagrange interpolation. The formula for the Lagrange interpolation is illustrated below in Formula 1. It has been found that selecting a polynomial of order 3 may produce an interpolated value that is within an acceptable margin of error.

$$f(x) = \sum_{i=0}^{u} \left( \prod_{\substack{j=0 \\ j \neq i}}^{u} \frac{x - x_j}{x_i - x_j} \right) f_i \qquad (1)$$

Where x=attenuation or phase data, f=resistivity data, and u=order of polynomial The processor may compute an interpolated value for resistivity using the Lagrange interpolation formula or any other interpolation method. One of ordinary skill will understand that performing interpolation calculations which may include a plurality of multiplications and divisions may be processor and memory intensive even when a low order polynomial is selected. Furthermore, accurate interpolation may require a large number of data points thereby increasing table sizes. Computational resources such as memory and available processing cycles for interpolation may be limited on downhole tool 102 due to tool design constraints as previously described.

Figure 4:
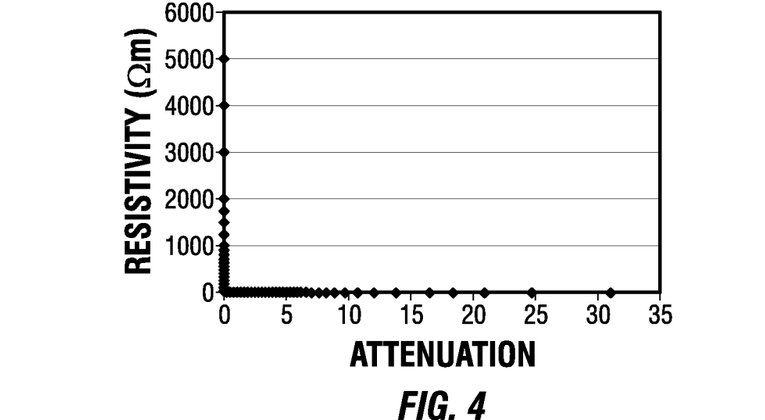
FIG. 4 illustrates a plot of attenuation versus resistivity.
Figure 5:
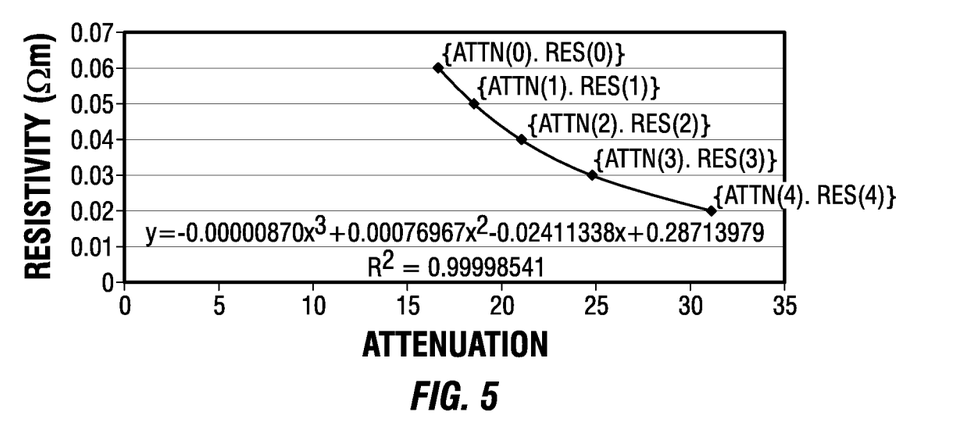
FIG. 5 illustrates a segment of a plot of attenuation versus resistivity.

A method to reduce the number of data points required and eliminate the need for interpolation may be provided. A plot of an exemplary table of attenuation versus resistivity is illustrated in FIG. 4. The plot is generated for attenuation versus resistivity for a 2 MHz signal frequency and 16" (40.64 cm) spacing of the receiver and transmitter. As illustrated, the data trend is highly non-linear and may not easily be expressed with a lower order polynomial. Calculating a resistivity result for a higher order polynomial that fits the plot in FIG. 4 may require more computational resources than performing the Lagrange interpolation calculation. However, the data points may be plotted in groups such that individual curves representing each group may be represented by a low order polynomial. An example is shown in FIG. 5 for a group of the last five points from FIG. 4 which a third order polynomial may be calculated for. The coefficient of determination ($r^2$) for the exemplary plot is greater than 0.9999 which may suggest that the third order polynomial fits the data with little variance from the true values of the data points. More data points could be included in the plot but the $r^2$ value may decrease due to the $3^{rd}$ order polynomial not fitting the data well due to the high degree of non-linearity in the data. Increasing the polynomial to a higher order and fitting the data may yield a higher $r^2$ value but will also increase the computational requirements as described above.

Figure 6:
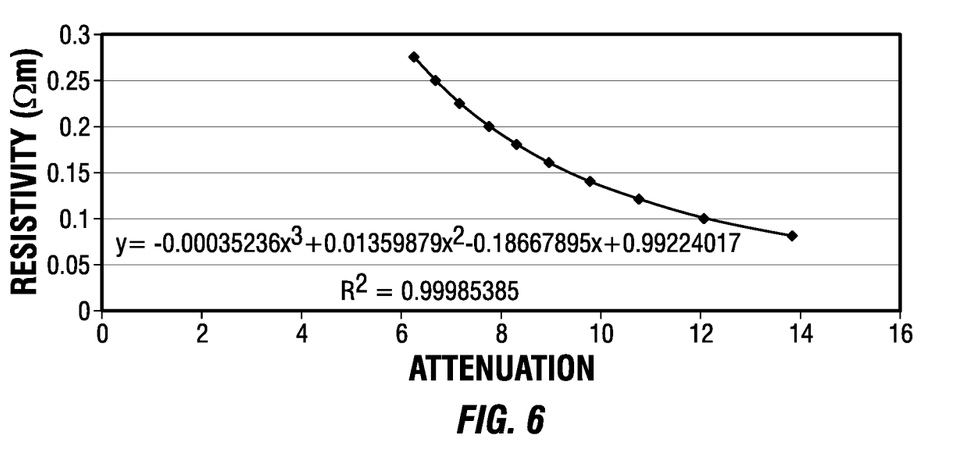
FIG. 6 illustrates a segment of a plot of attenuation versus resistivity.
Figure 7:
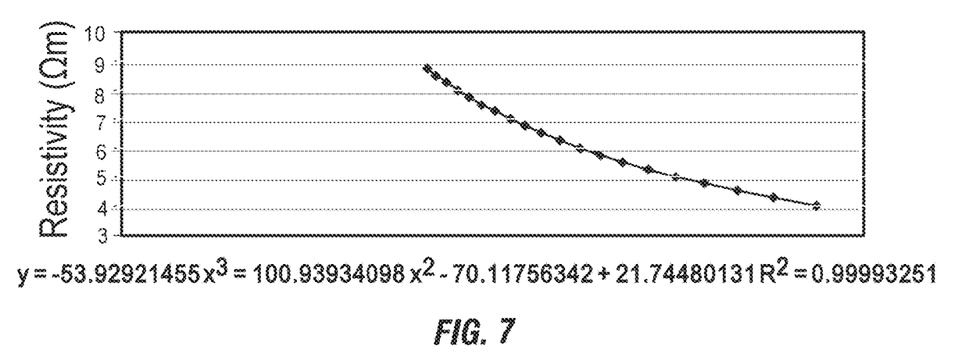
FIG. 7 illustrates a segment of a plot of attenuation versus resistivity.

Additional plots of segments of data from FIG. 4 are illustrated in FIGS. 6 and 7. FIG. 6 illustrates attenuation versus resistivity for a segment of data wherein a third order polynomial has an $r^2$ value of greater than 0.999, and FIG. 7 illustrates attenuation versus resistivity for another segment of data wherein the third order polynomial has an $r^2$ value of greater than 0.9999.

The lookup table data may be further segmented and a polynomial may be calculated for each segment. A segmented lookup table may be generated comprising the minimum or maximum attenuation or phase for a segment, effectively the points where each polynomial is bounded, and the polynomial coefficients corresponding to the bounded segment. For example, in FIG. 5 the minimum attenuation is 16 and the maximum is 31 with the coefficients being {−8.7*10$^{-6}$, 7.6967*10$^{-4}$, 2.411338*10$^{-2}$, 0.28713979}. An exemplary segmented lookup table is illustrated in Table 2. The segmented lookup table may be stored in memory 335 as segmented lookup table 345.

TABLE 2

| Segment | Min/Max Attenuation of Segment | 3rd order polynomial coefficients of Attn segment |
|---|---|---|
| S1 | Attn min/max S1 | $\{a_3, a_2, a_1, a_0\}$ |
| S2 | Attn min/max S2 | $\{a_3, a_2, a_1, a_0\}$ |
| ... | ... | ... |
| Snseg | Attn min/max nseg | $\{a_3, a_2, a_1, a_0\}$ |

| Segment | Min/Max Phase of Segment | 3rd order polynomial coefficients of Phase segment |
|---|---|---|
| 1 | Phase min/max S1 | $\{a_3, a_2, a_1, a_0\}$ |
| 2 | Phase min/max S2 | $\{a_3, a_2, a_1, a_0\}$ |
| ... | ... | ... |
| nseg | Phase min/max nseg | $\{a_3, a_2, a_1, a_0\}$ |

After the tables are completed for a certain frequency and spacing, resistivity may be calculated using a polynomial for any attenuation or phase values as shown in Formula 2 and Formula 3.

$$\text{Resistivity} = a_3(\text{Attenuation})^3 + a_2(\text{Attenuation})^2 + a_1(\text{Attenuation}) + a_0 \quad (2)$$

$$\text{Resistivity} = a_3(\text{Phase})^3 + a_2(\text{Phase})^2 + a_1(\text{Phase}) + a_0 \quad (3)$$

Calculating a polynomial may be significantly quicker than performing the Lagrange or other interpolation method. For example, if a table contains 210 data points, a worst case binary search may require 8 searches to find the data point in a lookup table. If a polynomial of degree 3 is selected to expand in the Lagrange interpolation, there will be 12 divisions and 12 multiplications required to compute the resistivity. In contrast, a segmented lookup table based on the 210 data points may require 15 to 20 segments to capture the data points. A worst case binary search may require 5 searches to complete and computing a $3^{rd}$ order interpolation may require an additional 5 multiplications. The present method may improve the search speed by (1−5/8)*100=37.5% and computation speed by (1−5/24)*100=79.16% given 210 data points and assuming 15 to 20 segments.

Additionally the methods described herein may reduce the usage of internal memory. For a downhole tool 102 operating at two frequencies and three spacings, the tool would require 14 tables. Each data point may be a floating point variable of 4 bit length for a total of 840 bytes per table and 12 Kbytes total memory utilization for all the tables. In contrast, the present method utilizing an average 15 segments per table translates to 60 bytes for each attenuation and phase table and 240 bytes for a polynomial coefficients table for a total of 300 bytes. With two frequencies and three spacings the segmented lookup tables and polynomial coefficient table would require approximately 3.6 Kbytes of memory for a saving of (1−3.6/12)*100=70% as compared to previous methods.

Figure 8:
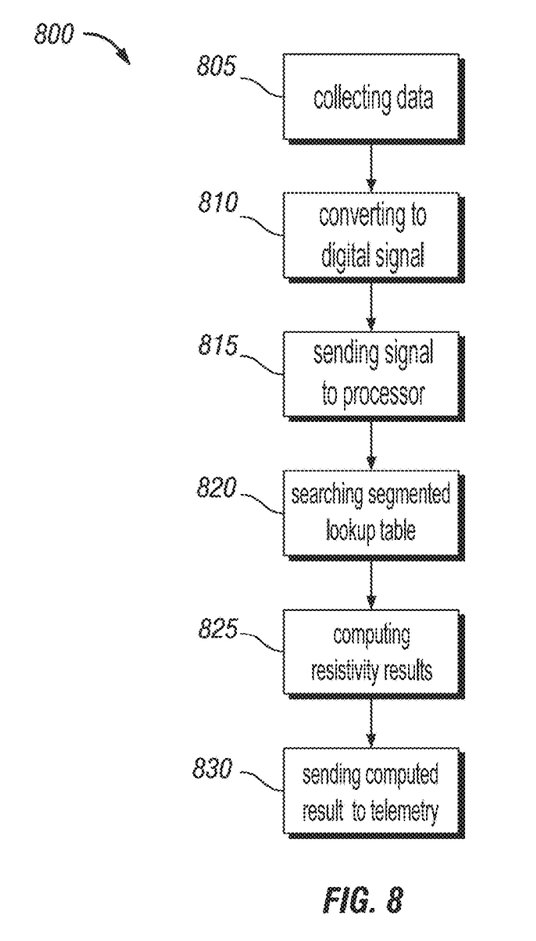
FIG. 8 illustrates a flow chart of a downhole processing system.

FIG. 8 illustrates a flow chart of the previously described method 800 of using segmented lookup tables on a downhole tool. Method 800 may start with block 805 comprising collecting data from one or more sensors. The collected data may be in the form of an analog or a digital signal depending on the method and tool used to collect the data. If the signal is an analog signal, the signal may be converted to a digital signal in block 810 and sent to the processor in block 815. If the signal is digital, it may be sent directly to the processor in block 815. Block 820 may comprise the processor searching a segmented lookup table in memory for the input segment the signal falls within. The input segment may correspond to a set of polynomial coefficients which may be returned to the processor. Block 825 may comprise computing a result of a polynomial comprising the returned coefficients and using the signal as an input to the polynomial. Block 830 may comprise sending the computed result to a telemetry unit or other processes previously described.

Although only described herein for a single signal frequency and spacing, it should be understood that the techniques described herein may be applied to any signal frequency and spacing in a resistivity tool. Furthermore, the methods and techniques described herein may be extended to any downhole tools that have a non-linear function to convert measurements to data that may process measurements onboard the tool.

This method and system may include any of the various features of the methods and systems disclosed herein, including one or more of the following statements.

Statement 1. A method for well logging comprising: inserting a downhole tool into a wellbore penetrating a subterranean formation wherein the downhole tool comprises: a transmitter; a receiver; a memory configured to store at least one look up table with polynomial coefficients; and a processor coupled to the memory; obtaining a measurement using the downhole tool; and generating a resistivity output using the measurement as an input to a polynomial with polynomial coefficients sourced from the look up table.

Statement 2. The method of statement 1 wherein the downhole tool is operable to measure a resistivity.

Statement 3. The method of any preceding statement wherein the look up table comprises a plurality of segments, wherein each of the segments correspond to a bounded range of inputs, and wherein each of the segments corresponds to a set of polynomial coefficients.

Statement 4. The method of any preceding statement wherein the polynomial represented by the polynomial coefficients comprises a third degree polynomial.

Statement 5. The method of any preceding statement wherein the polynomial represented by the polynomial coefficients has a coefficient of determination greater than 0.9.

Statement 6. The method of any preceding statement wherein the step of generating comprises: comparing the measurement to the bounded ranges of inputs to determine the corresponding set of polynomial coefficients; and calculating the resistivity output from the corresponding set of polynomial coefficients.

Statement 7. The method of any preceding statement wherein the step of obtaining a measurement comprises obtaining a measurement of a phase of a signal, a measurement of attenuation of the signal, a measurement of both the phase of the signal and the attenuation of the signal.

Statement 8. The method of any preceding statement wherein the downhole tool further comprises a telemetry unit and the method further comprises sending the resistivity output to a surface using the telemetry unit.

Statement 9. A downhole tool comprising: a transmitter; a receiver; a memory configured to store at least one look up table comprising polynomial coefficients that represent a non-linear function of a measurement versus resistivity, wherein the at least one look up table comprises a plurality of segments, wherein each of the segments correspond to a bounded range of inputs, and wherein each of the segments corresponds to a set of polynomial coefficients; and a processor coupled to the memory, wherein the processor is configured to: compare an input signal to the bounded range of inputs to determine a segment the plurality of segments the input signal corresponds to; retrieve the set of polynomial coefficients corresponding to the determined segment; and calculate a resistivity output using the input signal as an input to a polynomial comprising the set of polynomial coefficients corresponding to the determined segment.

Statement 10. The downhole tool of statement 9 wherein the downhole tool is a resistivity tool.

Statement 11. The downhole tool of any of statements 9-10 wherein the transmitter and the receiver are configured to generate the input signal.

Statement 12. The downhole tool of any of statements 9-11 wherein the input signal is a measurement of a phase of a signal propagated in a wellbore or a measurement of attenuation of a signal propagated in the wellbore.

Statement 13. The downhole tool of any of statements 9-12 wherein the polynomial comprising the set of polynomial coefficients corresponding to the determined segment is a third degree polynomial.

Statement 14. The downhole tool of any of statements 9-13 further comprising a telemetry unit operable to receive the resistivity output and transmit the resistivity output to a surface.

Statement 15. The downhole tool of any of statements 9-14 wherein the telemetry unit is a mud pulse telemetry unit.

Statement 16. A system comprising: a conveyance; and a downhole tool coupled to the conveyance, the downhole tool comprising: a transmitter; a receiver; a memory configured to store at least one look up table comprising polynomial coefficients that represent a non-linear function of a measurement versus resistivity; and a processor coupled to the memory.

Statement 17. The system of statement 16 wherein the conveyance is a wireline or a drill pipe.

Statement 18. The system of any of statements 16-17 wherein the at least one look up table comprises a plurality of segments, wherein each of the segments correspond to a bounded range of inputs, and wherein each of the segments corresponds to a set of polynomial coefficients.

Statement 19. The system of any of statements 16-18 wherein the processor is configured to: compare an input signal to the bounded range of inputs to determine the segment the input signal corresponds to; retrieve the set of polynomial coefficients corresponding to the determined segment; and calculate a resistivity output using the input signal as an input to a polynomial comprising the set of polynomial coefficients corresponding to the determined segment.

Statement 20. The system of any of statements 16-19 further comprising a mud pulse telemetry unit.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A downhole tool comprising:
   at least two transmitters;
   at least two receivers;
   a memory configured to store a segmented look up table comprising polynomial coefficients that represent a non-linear function of a measurement versus resistivity, wherein the at least one look up table comprises a plurality of segments, wherein each of the segments of the segmented lookup table correspond to a bounded range of inputs, wherein the bounded range of inputs extends between a minimum and a maximum value of an attenuation or phase, and wherein each of the segments corresponds to a set of pre-generated 3rd order or higher order polynomial coefficients comprising at least 4 coefficients derived from a polynomial regression, wherein the look up table comprises attenuation and phase for each spacing between each transmitter of a set of two or more transmitters and a corresponding receiver of a set of two or more receivers; and an analog to digital converter configured to convert analog signals from the receiver to digital signal to a processor coupled to the memory, wherein the processor is configured to:
  process the digital signal with differential Fourier transform to determine attenuation and/or phase difference;
  compare an input signal to the bounded range of inputs to determine a segment of the plurality of segments the input signal corresponds to;
  retrieve the set of polynomial coefficients corresponding to the determined segment; and
  calculate a resistivity output corresponding to the attenuation or phase obtained in the look up table for the spacing between the transmitter and the receiver of the downhole tool with Lagrange interpolation using the input signal as an input to a polynomial comprising the set of polynomial coefficients corresponding to the determined segment.

2. The downhole tool of claim 1, wherein the downhole tool is a resistivity tool.

3. The downhole tool of claim 1, wherein the transmitter and the receiver are configured to generate the input signal.

4. The downhole tool of claim 1, wherein the input signal is a measurement of a phase of a signal propagated in a wellbore or a measurement of attenuation of a signal propagated in the wellbore.

5. The downhole tool of claim 1, wherein the polynomial comprising the set of polynomial coefficients corresponding to the determined segment is a third degree polynomial.

6. The downhole tool of claim 1, further comprising a telemetry unit operable to receive the resistivity output and transmit the resistivity output to a surface.

7. The downhole tool of claim 6, wherein the telemetry unit is a mud pulse telemetry unit.

* * * * *